United States Patent
Campo Trapero et al.

(10) Patent No.: US 11,765,200 B2
(45) Date of Patent: Sep. 19, 2023

(54) METHODS, NODES AND OPERATOR NETWORK FOR ENABLING MANAGEMENT OF AN ATTACK TOWARDS AN APPLICATION

(71) Applicant: Telefonaktiebolaget LM Ericsson (publ), Stockholm (SE)

(72) Inventors: Javier Campo Trapero, Madrid (ES); Miguel Angel Muñoz De La Torre Alonso, Madrid (ES); Franco Foresti, Madrid (ES); Rodrigo Alvarez Dominguez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 513 days.

(21) Appl. No.: 17/047,834

(22) PCT Filed: Aug. 15, 2018

(86) PCT No.: PCT/EP2018/072126
§ 371 (c)(1),
(2) Date: Oct. 15, 2020

(87) PCT Pub. No.: WO2019/201458
PCT Pub. Date: Oct. 24, 2019

(65) Prior Publication Data
US 2021/0112079 A1    Apr. 15, 2021

(30) Foreign Application Priority Data

Apr. 17, 2018    (EP) .................................... 18382259

(51) Int. Cl.
H04L 9/40    (2022.01)
(52) U.S. Cl.
CPC ........ H04L 63/145 (2013.01); H04L 63/1416 (2013.01); H04L 63/20 (2013.01)

(58) Field of Classification Search
None
See application file for complete search history.

(56) References Cited

U.S. PATENT DOCUMENTS 7,058,821 B1 * 6/2006 Parekh .................. H04L 63/145
    713/194
9,819,669 B1 * 11/2017 Golwalkar .......... H04L 63/0218
    (Continued)

FOREIGN PATENT DOCUMENTS

| EP | 3 226 508 A1 | 10/2017 |
| WO | 2014/189521 A1 | 11/2014 |

OTHER PUBLICATIONS

International Search Report and Written Opinion issued in International Application No. PCT/EP2018/072126 dated Nov. 9, 2018 (11 pages).

(Continued)

*Primary Examiner* — Joseph P Hirl
*Assistant Examiner* — Hassan Saadoun
(74) *Attorney, Agent, or Firm* — Rothwell, Figg, Ernst & Manbeck, P.C.

(57) ABSTRACT

Methods, a user data node (120), a policy node (150), an application node (170) and an operator network (101) for enabling management of an attack towards an application (190) hosted by the application node (170) are disclosed. The policy node (150) receives (3) attack information and an identifier of the application (190) to which the attack information applies. The attack information relates to the management of the attack and the attack information comprises a type of attack, a set of detection conditions relating to detection of attacks of the type of attack, and a mitigation action to be invoked when at least one detection condition of the set of detection conditions is fulfilled. In this manner, degeneration of the application (190) caused by the attacks of the type of attack is mitigatable. The policy node (150)

(Continued)

generates (13) at least one rule based on the attack information. Moreover, the operator network (101) transfers (14, 15), from the policy node to the user data node (120), said at least one rule. The user data node (120) detects (18), in traffic towards the application (190), the attack while utilizing said at least one rule. Corresponding computer programs and computer program carriers are also disclosed.

20 Claims, 7 Drawing Sheets

(56) References Cited

U.S. PATENT DOCUMENTS

| | | | |
|---|---|---|---|
| 10,742,682 B2* | 8/2020 | Yu | H04L 9/40 |
| 2016/0080401 A1* | 3/2016 | Zhou | H04L 67/02 |
| | | | 726/1 |
| 2016/0088020 A1* | 3/2016 | Chan | H04L 63/20 |
| | | | 726/1 |
| 2017/0032130 A1* | 2/2017 | Joseph Durairaj | |
| | | | H04L 63/1416 |
| 2017/0339187 A1* | 11/2017 | Papamartzivanos | G06N 3/126 |

OTHER PUBLICATIONS

3GPP TS 29.122 V0.2.0 (Sep. 2017), 3rd Generation Partnership Project; Technical Specification Group Core Network and Terminals; T8 reference point for Northbound APIs (Release 15), Sep. 2017 (78 pages).

* cited by examiner

METHODS, NODES AND OPERATOR NETWORK FOR ENABLING MANAGEMENT OF AN ATTACK TOWARDS AN APPLICATION

CROSS REFERENCE TO RELATED APPLICATION(S)

This application is a 35 U.S.C. § 371 National Stage of International Patent Application No. PCT/EP2018/072126, filed Aug. 15, 2018, designating the United States and claiming priority to EP Application No. 18382259.2, filed on Apr. 17, 2018. The above identified applications are incorporated by reference.

TECHNICAL FIELD

Embodiments herein relate to wireless communication systems, such as radio communication systems, cellular systems, mobile telephone communication systems or the like. In particular, a user data node, a policy node, an application node and an operator network as well as corresponding methods therein for enabling management of an attack towards an application hosted by the application node are disclosed. Corresponding computer programs and computer program carriers are also disclosed.

BACKGROUND

Management and monitoring of traffic occurs in many different computer systems or architectures, such as those that are specified by the Third Generation Partnership Project (3GPP).

A known reference architecture for fifth generation (5G) networks is defined by 3GPP Technical Specifications (TS) 23.501 V0.5.0 (2017-05), section 4.2.3. A few so called network functions of the known reference architecture are described in the following. Some interfaces between the network functions are also described.

Typically, a Packet Flow Description Function (PFDF) is included inside a Network Exposure Function (NEF) to reduce the number of network functions in 5G. The PFDF handles Packet Flow Descriptions (PFDs) associated with an application identifier and transfers them to a Session Management Function (SMF) via Next Generation (NG) Gw interface. The SMF sends the PFDs towards a User Plane Function (UPF) by means of an N4 PFD Management procedure to enable the UPF to perform accurate application detection when the PFDs are managed by a 3rd party service provider, aka Application Service Provider (ASP).

TS 29.122, Release (Rel.) 15 defines a so called T8 interface between a Service Capability Server/Application Server (SCS/AS) and the NEF in the case of the 5G reference architecture or a Service Capability Exposure Function (SCEF) in case of a 4G network reference architecture. The T8 interface specifies RESTful Application Programming Interfaces (APIs) that allow the SCS/AS to access services and capabilities provided by network entities and that allow the SCEF to securely expose these interfaces. One of those APIs is a monitoring event API, as described in subclause 4.4.6.1 in TS 23.682, where SCS/AS can subscribe to some monitoring events like UE loss of connectivity, UE location reporting, UE roaming status, communication failure, change of International Mobile Equipment Identification (IMEI)—International Mobile Subscriber Identification (IMSI) association. Other APIs like NetworkParameterConfiguration API defines allows the SCS/AS to send the suggested network parameters to influence certain aspects of UE/network behavior.

A Policy and Charging Rules Function (PCF) is a functional element that performs policy control decision and flow-based charging control. The PCF provides network control regarding the service data flow t.

A Session Management Function (SMF) manages Non Access Stratum (NAS) handling for Session Management (SM), User Equipment (UE) Internet Protocol (IP) address allocation & management, Sending QoS/policy NG2 information to the AN via AMF, Idle/Active aware, UE IP address allocation & management, Policy & Offline/Online Charging i/f termination, Policy enforcement control part, Lawful intercept (CP and interface to LI System), UP selection and termination of NG4 interface The UPF, which may include a Policy Control Enforcement Function (PCEF), encompasses service data flow detection, policy enforcement and flow-based charging functionalities. Anchor point for Intra-/Inter-Radio Access Technology (RAT) mobility when applicable, External IP point of interconnect, Packet routing & forwarding, Quality of Service (QoS) handling for User plane, Packet inspection and Policy Control and Charging (PCC) rule enforcement, Lawful intercept (UP collection), Roaming interface (UP), Traffic counting and reporting TS 23.682 Rel. 15 specifies the architecture enhancements to facilitate communications with packet data networks and applications.

Furthermore, applications, hosted on e.g. a SCS/AS of a system based on the architecture above, may be exposed to a broad range of well-known security attacks. The broad range of security attacks may be classified into:

Passive attacks, such as Wiretapping, Port scan, Idle scan and the like,

Active attacks such as Denial-of-Service (DoS), spoofing, network, and host attacks which are described in the following in more detail:

i. Denial-of-Service (DoS) attacks may occur when a perpetrator seeks to make a machine's or network's resources unavailable to its intended users by temporarily or indefinitely disrupting services of a host connected to the Internet. Denial of Service is typically accomplished by flooding the targeted machine or resource with superfluous requests in an attempt to overload systems and prevent some or all legitimate requests from being fulfilled.

A more advanced type of DoS attack is referred to as a Distributed Denial-of-Service attacks (DDoS attack). In this case, the traffic, which is flooding the victim, originates from many different sources. This effectively makes it impossible to stop the attack simply by blocking a single source.

These types of DoS attacks may use different protocols, such as Transfer Control Protocol (TCP) Synchronized (SYN) flooding, application level flooding using Hyper Text marked-up language Transfer Protocol (HTTP) GET/POST and the like.

ii. Spoofing attacks relate to when false traffic is masqueraded as true traffic e.g. by manipulating a source address.

iii. Network attacks, such as Man in the middle, Address Resolution Protocol poisoning, Ping flood, Ping of death, Smurf attack and the like, and iv. Host attacks by causing buffer overflow, heap overflow, stack overflow, Format string attack etc.

Network Service Providers (NSP), e.g. operators, and Application Service Providers (ASP)/Over-the-Top (OTT) players are challenged due to an expected exponential increase of connected devices due to 5G and Internet-of-Things (IoT), which implies much higher probability of attack, security vulnerabilities and threats.

In view of the foregoing, an exemplifying 5G network architecture may communicate with an application that is deployed by an AS. The application provides a service for a client, executed by e.g. a user equipment. The application and/or the service can be exposed to a security attack, such as (D)DoS, Spoofing or the like.

In order to prevent attacks, the application is typically deployed while overprovisioning bandwidth. This does not eliminate effects of an attack. Additionally, resources related to bandwidth are thus not efficiently used. Likely, the effects of the attack will merely be delayed, since the time before the application is overwhelmed will be longer thanks to the overprovisioned bandwidth.

When the effects of the attack are causing degeneration, such as delay, interruption or the like, of the application and/or service, the ASP/OTT typically asks the NSP for help, to reduce down time of the application. Sometimes, the NSP may be able to help or they are also overwhelmed by the attack.

A problem may thus be how to at least enable improved handling of attacks in order to prevent, or at least mitigate, effects of the attacks, such as the abovementioned (D)DoS attack, in a network architecture of the abovementioned kind or the like.

SUMMARY

An object may be to overcome or at least reduce the above mentioned problem.

According to an aspect, the object is achieved by a method, performed by a user data node, for enabling management of an attack towards an application hosted by an application node, whereby the application degenerates due to the attack. The user data node receives at least one rule originating from a policy node. Said at least one rule comprises attack information provided to the policy node, and an identifier of the application to which the attack information applies. The attack information relates to the management of the attack and the attack information comprises a type of attack, a set of detection conditions relating to detection of attacks of the type of attack, and a mitigation action to be invoked when at least one detection condition of the set of detection conditions is fulfilled, whereby degeneration of the application caused by the attacks of the type of attack is mitigatable. The user data node detects, in traffic towards the application, the attack while utilizing said at least one rule.

According to another aspect, the object is achieved by a method, performed by a policy node, for enabling management of an attack towards an application hosted by an application node, whereby the application degenerates due to the attack. The policy node receives attack information and an identifier of the application to which the attack information applies. The attack information relates to the management of the attack and the attack information comprises a type of attack, a set of detection conditions relating to detection of attacks of the type of attack, and a mitigation action to be invoked when at least one detection condition of the set of detection conditions is fulfilled, whereby degeneration of the application caused by the attacks of the type of attack is mitigatable. The policy node generates at least one rule based on the attack information. Said at least one rule comprises the identifier and the attack information. The policy node transmits said at least one rule towards a user data node for managing the attack.

According to a further aspect, the object is achieved by a method, performed by an application node for hosting an application, for enabling management of an attack towards the application, whereby the application degenerates due to the attack. The application node transmits, towards a policy node, attack information relating to the management of at least the attack and an identifier of the application to which the attack information applies, the attack information comprises a type of attack, a set of detection conditions relating to detection of attacks of the type of attack, and a mitigation action to be invoked when at least one detection condition of the set of detection conditions is fulfilled, whereby degeneration of the application caused by the attacks of the type of attack is mitigatable.

According to a still further aspect, the object is achieved by a user data node configured for enabling management of an attack towards an application hosted by an application node, whereby the application degenerates due to the attack. The user data node is configured for receiving at least one rule originating from a policy node. Said at least one rule comprises attack information provided to the policy node, and an identifier of the application to which the attack information applies. The attack information relates to the management of the attack and the attack information comprises a type of attack, a set of detection conditions relating to detection of attacks of the type of attack, and a mitigation action to be invoked when at least one detection condition of the set of detection conditions is fulfilled, whereby degeneration of the application caused by the attacks of the type of attack is mitigatable. The user data node is configured for detecting, in traffic towards the application, the attack while utilizing said at least one rule.

According to yet another aspect, the object is achieved by a policy node configured for enabling management of an attack towards an application hosted by an application node, whereby the application degenerates due to the attack. The policy node is configured for receiving attack information and an identifier of the application to which the attack information applies. The attack information relates to the management of the attack and the attack information comprises a type of attack, a set of detection conditions relating to detection of attacks of the type of attack, and a mitigation action to be invoked when at least one detection condition of the set of detection conditions is fulfilled, whereby degeneration of the application caused by the attacks of the type of attack is mitigatable. The policy node is configured for generating at least one rule based on the attack information. Said at least one rule comprises the identifier and the attack information. The policy node is configured for transmitting said at least one rule towards a user data node for managing the attack.

According to a yet further aspect, the object is achieved by an application node for hosting an application. The application node is configured for enabling management of an attack towards the application, whereby the application degenerates due to the attack. The application node is configured for transmitting, towards a policy node, attack information relating to the management of at least the attack and an identifier of the application to which the attack information applies, the attack information comprises a type of attack, a set of detection conditions relating to detection of attacks of the type of attack, and a mitigation action to be invoked when at least one detection condition of the set of detection conditions is fulfilled, whereby degeneration of the application caused by the attacks of the type of attack is mitigatable.

According to further aspects, the object is achieved by computer programs and computer program carriers corresponding to the aspects above.

The attack information comprises, such as indicates, includes or the like, the type of attack, the set of detection conditions and the mitigation action. In this manner, the application node informs the operator network, and in particular the user data node and the policy node, how attacks may be detected and/or mitigated. As a result, the operator network is enabled to manage a potential or ongoing attack towards the application by use of the attack information.

An advantage with embodiments herein is that a network operator may handle attacks more efficiently thanks to increased knowledge—carried by the attack information. The attack information may indicate when the deployed application is considered to be under attack, how to mitigate effects of an attack and the like.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
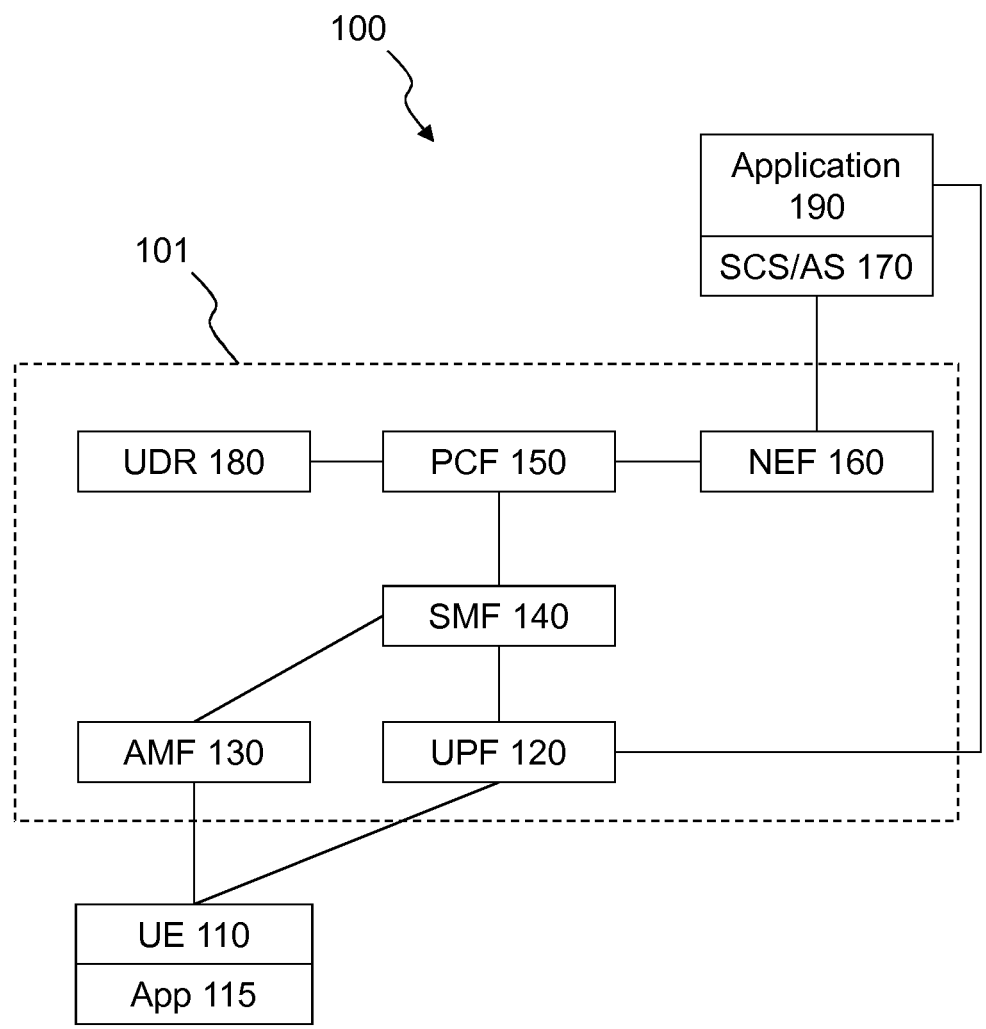
FIG. 1 is a schematic overview of an exemplifying system in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying system 100 in which embodiments herein may be implemented.

In this example, the system 100 may comprise an operator network 101. The operator network 101 may comprise a Global System for Mobile communications network, a Long Term Evolution (LTE), Universal Mobile Telecommunication System (UMTS) and Worldwide Interoperability for Microwave Access (WiMAX), evolutions thereof or the like.

The system 100 may be said to comprise a user equipment 110. This may mean that the user equipment 110 is present in the operator network 101, such as attached thereto, connected thereto or the like. In a similar manner multiple user equipments may be connected (not shown here for simplicity).

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Furthermore, the system 100 and/or the operator network 101 may comprise a user data node 120, shown as UPF, an AMF 130, a SMF 140, a policy node 150, shown as PCF, a NEF 160 and an attack information storing node 180, shown as UDR, User Data Repository. These functions, or entities, may have their known functionality in addition to what is described below.

The user data node 120 may handle deep packet inspection and service classification, which requires updated rules from the policy node 150 in order to classify traffic from UE 110 properly and to apply, for instance, desired QoS, charging and/or the like.

The policy node 150 may take policy decisions and manages charging based on so called charging rules according to known manners.

The system 100 may comprise an application node 170, shown as SCS/AS, which may host an application 190. The application 190 may provide a service, such as streaming of video, providing sensor data, providing any information on request, being able to receive any information for storage etc. The application 190 may implement any service provided by an OTT, ASP or the like. Expressed differently, the application node 170 may host a server, e.g. providing the aforementioned service, while communicating with the operator network 101 through T8 interface, which is known from 3GPP-terminology.

Furthermore, the user data node 120 may manage forwarding of user data, or traffic, to/from the user equipment 110 from/to the application 190 hosted by the application node 170.

The UE 110 may voluntarily or non-voluntarily create an attack, i.e. that may cause the application 190 to degenerate. An attack may be caused also by multiple UEs, e.g. a DDoS attack.

Additionally, the user equipment 110 may host a client application (app) 115, which may act as a client to the application 190.

Figure 2:
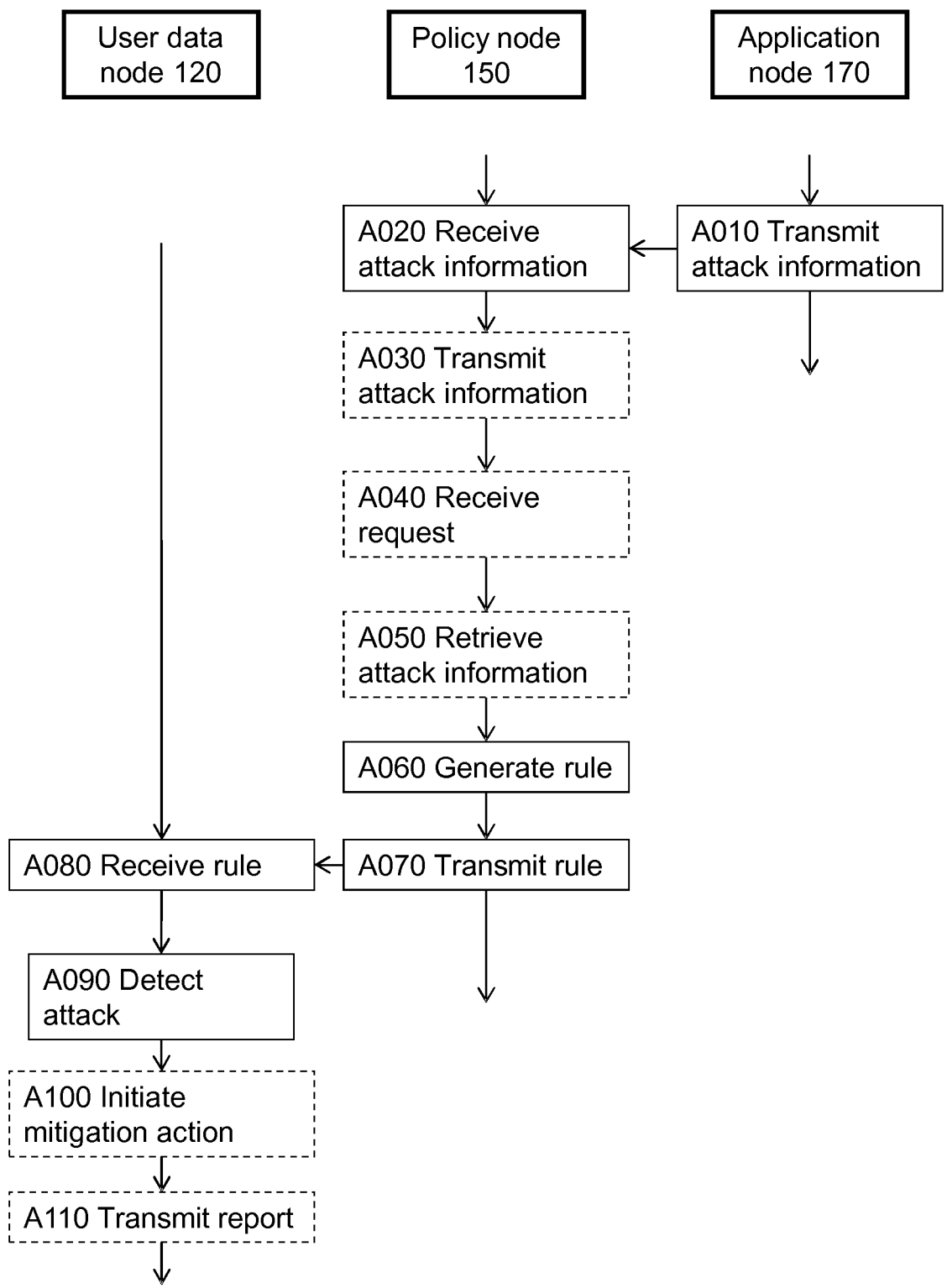
FIG. 2 is a combined signaling and flowchart illustrating the methods herein.

FIG. 2 illustrates an exemplifying method according to embodiments herein when implemented in the system 100 of FIG. 1.

According to the scenario of FIG. 2, the UE 110 is properly connected to the operator network 101, in which there the user data node may include capabilities for deep packet inspection and service classification. The application node 170 may host, or implement, the application 190 as an ASP server deployment, either inside operator network 101 or on public internet.

The user data node 120 performs a method for enabling management of an attack towards an application 190 hosted by an application node 170, whereby the application 190 degenerates due to the attack.

The policy node 150 performs a method for enabling management of an attack towards an application 190 hosted by an application node 170, whereby the application 190 degenerates due to the attack.

The application node 170 performs a method for enabling management, e.g. by the user data node 120, of an attack towards the application 190, whereby the application 190 degenerates due to the attack.

One or more of the following actions may be performed in any suitable order.

Action A010

In order to make the policy node 150 aware of the attack information, the application node 170 transmits, towards the policy node 150, attack information relating to the management of at least the attack and an identifier of the application 190 to which the attack information applies. The attack information comprises, such as indicates, provides indications of or the like:
 a type of attack,
 a set of detection conditions relating to detection of attacks of the type of attack, and
 a mitigation action, or one or more mitigation actions, to be invoked when at least one detection condition of the set of detection conditions is fulfilled, whereby degeneration of the application 190 caused by the attacks of the type of attack is mitigatable.

The type of attack may indicate DoS, DDoS, Spoofing, etc. Furthermore, the type of attack may also comprise additional, more detailed information, like ping scan, SYN flood, GET/POST flooding, volume based, etc.

The set of detections conditions, such as detection thresholds, values, limits, events or sequence of events, or the like or combinations thereof, may relate to the given type of attack. The set of detection conditions may thus comprise one or more detection conditions. As an example, a first threshold may relate to allowable number of simultaneous flows per user, per app 115 or the like, a second threshold may related to allowable number of subnets requested per user, per app 115 or the like, a third threshold may relate to allowable number of non-completed handshakes per user, per app 115 or the like, a fourth threshold may relate to allowable number of simultaneous handshakes per user, per app 115 or the like, towards the same IP address, a fifth threshold may relate to allowable rate toward the same IP address, etc. In this context, "allowable" may refer to that when e.g. the allowable number related to any one of the conditions above or other condition is exceeded, degeneration of the application may be caused.

The mitigation action may provide instructions to reset flows, to redirect suspicious traffic to a specific network slice that involves putting the user, the app 115 or the like, in quarantine, e.g. through service chaining or SDN rules to a new node where malicious traffic is identified and separated, to drop packet(s)/traffic, to report, to block, to charge the traffic less or not at all, etc.

The attack information may further comprise a status of the attack, wherein the status may be active/live or potential. The status of the attack thus indicates that the attack, given by the type of attack, may be a potential attack, a live attack or the like. In case it is a live attack that has been detected by the ASP/OTT the mitigation action specified is enforced directly, i.e. as soon as possible e.g. without intentional delay.

According to further examples, the attack information may comprise, e.g. on a per identifier of the application basis:
 a rate limit of traffic from the operator network 101, e.g. from the application node 170, to prevent the application 190, e.g. a web server, from being overwhelmed. This is an example of a detection condition of the set of detection conditions.
 an instruction to add filters to tell the application node 170 to drop packets from obvious sources of attack. This is an example of the mitigation action.
 an instruction to timeout of half-open connections. This is an example of the mitigation action.
 an instruction to drop spoofed or malformed packets. This is an example of the mitigation action.
 thresholds relating to SYN, ICMP, and UDP flood dropping. This is an example of a detection condition of the set of detection conditions.

Action A020

The policy node 150 receives attack information and an identifier of the application 190 to which the attack information applies. The attack information relates to the management of the attack.

Action A030

The policy node 150 may transmit, towards the attack information storing node 180 for storing the attack information for the application 190 indicated by the identifier, the identifier and the attack information.

Action A040

The policy node 150 may receive a request for at least one rule to be applied to a session for enabling a user equipment 110 to be served by the application 190. The request may be caused by that the user equipment 110 requests the session, and the request indicates the identifier of the application 190.

Figure 3:
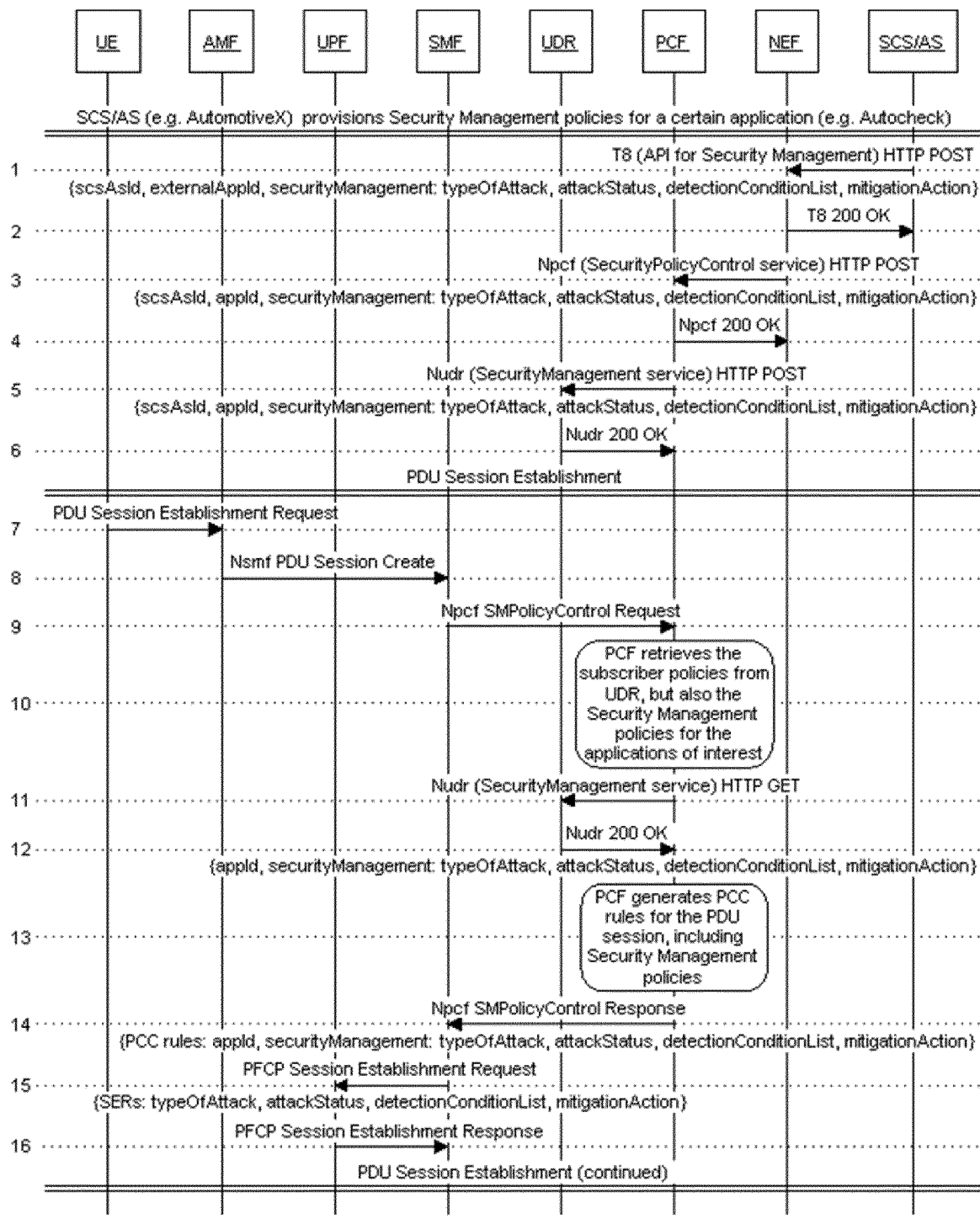
FIG. 3 and FIG. 4 are further combined signaling and flowcharts illustrating a more detailed example of some embodiments herein.

The request may be caused by that the user equipment 110 attaches to the operator network 101 as described in FIG. 3. As shown in FIG. 3, the request may be received from the session node 140, aka SMF. In this manner, a session between the application 190 and the app 115 may be established.

Action A050

The policy node 150 may retrieve, from an attack information storing node 180, attack information based on the identifier of the application 190.

In this manner, the policy node 150 may retrieve some particular attack information from the attack information storing node 180, which particular attack information is associated with the identifier of the application 190.

Action A060

In order to be able to configure the user data node 120 such as to be able to detect the attack, the policy node 150 generates at least one rule based on the attack information. Said at least one rule comprises the identifier and the attack information.

The generated at least one rule may then be provided to the user data node 120 as in action A070 directly below.

In some examples, said at least one rule is generated for the session based on the attack information.

Action A070

Subsequently to action A060, the policy node 150 transmits said at least one rule towards the user data node 120 for managing the attack. Thereby, the policy node 150 enables the user data node 120 to manage the attack by use of the attack information, in particular by use of the set of conditions and the mitigation action.

Action A080

Following action A070, the user data node 120 receives at least one rule originating from a policy node 150. Said at least one rule comprises attack information provided to the policy node 150, and an identifier of the application 190 to which the attack information applies. The attack information may originate from the application node 170. The attack information relates to the management of the attack.

Action A090

Now that the user data node 120 has obtained said at least one rule, the user data node 120 may monitor the traffic towards the application 180. It may then happen that the user data node 120 detects, in traffic towards the application 190, the attack while utilizing said at least one rule. The detection of the attack may be caused by that at least one detection condition of the set of detection conditions is fulfilled. For example, the allowable number of simultaneous flows per user, per app 115 or the like as described above may be exceeded, whereby the user data node 120 concludes that the application 190 appears to be exposed to the attack.

Action A100

In response to the detection 18 of the attack, the user data node 120 may initiate the mitigation action according to the attack information of the rule. Thus, when the mitigation action eventually is executed, the attack may be mitigated. Sometimes, a combination of mitigation actions may be required in order to efficiently mitigate the attack.

Action A110

In response to the detection of the attack, the user data node 120 may transmit, to the session node 140 for managing the session between the application 190 and a user equipment 110, or app 115, served by the application 190, a report indicating the mitigation action for a type of the detected attack. This may mean that the initiation of the mitigation action is exemplified by that the user data node 120 transmits the report.

The embodiments above may allow an operator of the operator network 101 to efficiently handle attacks, e.g. DDoS and the like, that are not possible to handle with known solutions. The ASP/OTT may provision the corresponding policies (e.g. thresholds, mitigation actions) according to their deployed resources, e.g. by means of the attack information. In this manner, the operator network 101 may be made aware of when the application 190 may be overwhelmed, i.e. degenerated due to the attack, the operator network 101 may avoid, or at least reduce, traffic, forming part of the attack, that is destined to the application, e.g. as given by the mitigation action of the attack information. As a result, effects of the attack may be avoided or at least reduced.

Hence, to summarize in somewhat more detail, the attack information comprises, such as indicates, includes or the like, the type of attack, the set of detection conditions and the mitigation action. In this manner, the application node, i.e. the ASP/OTT, informs the operator network, and in particular to the user data node and the policy node, how attacks may be detected and/or mitigated. In this context, the attacks typically refers to attacks towards the application identified by the identifier of the application. The attack information is typically provided over the T8 interface.

As more detailed example, the attack information is provisioned throughout the operator network, in particular from the application node, such as SCS/AS, of the OTT to the policy node, such as PCF, e.g. via NEF, and to the user data node, such as UPF, e.g. via the SMF, for at least one application susceptible to the attack.

This means, for example, that the application node may inform the operator network about is capacity in terms of a detection condition related to e.g. DoS-attacks. Assume that the application hosted by the application node is capable of handling 100 000 requests per minute. In order to protect itself from being overwhelmed the application and/or the application node may inform the operator network that an attack shall be considered to have been detected when the number of requests exceeds 90 000 requests per minute. That is to say, the limit is set lower than the maximum number of requests that the application is capable of handling. The number of requests, i.e. 90 000 requests per minute, may be provided as a detection condition of the set of detection conditions that is comprised in the attack information. As a result, the operator network is enabled to manage a potential or ongoing attack towards the application.

An advantage with embodiments herein is that a network operator, such as NSP or the like, may handle attacks more efficiently thanks to increased knowledge—carried by the attack information. The attack information, provided by the ASP/OTT by use of the application node, may indicate when the deployed application is considered to be under attack, how to mitigate effects of an attack and the like.

Figure 4:
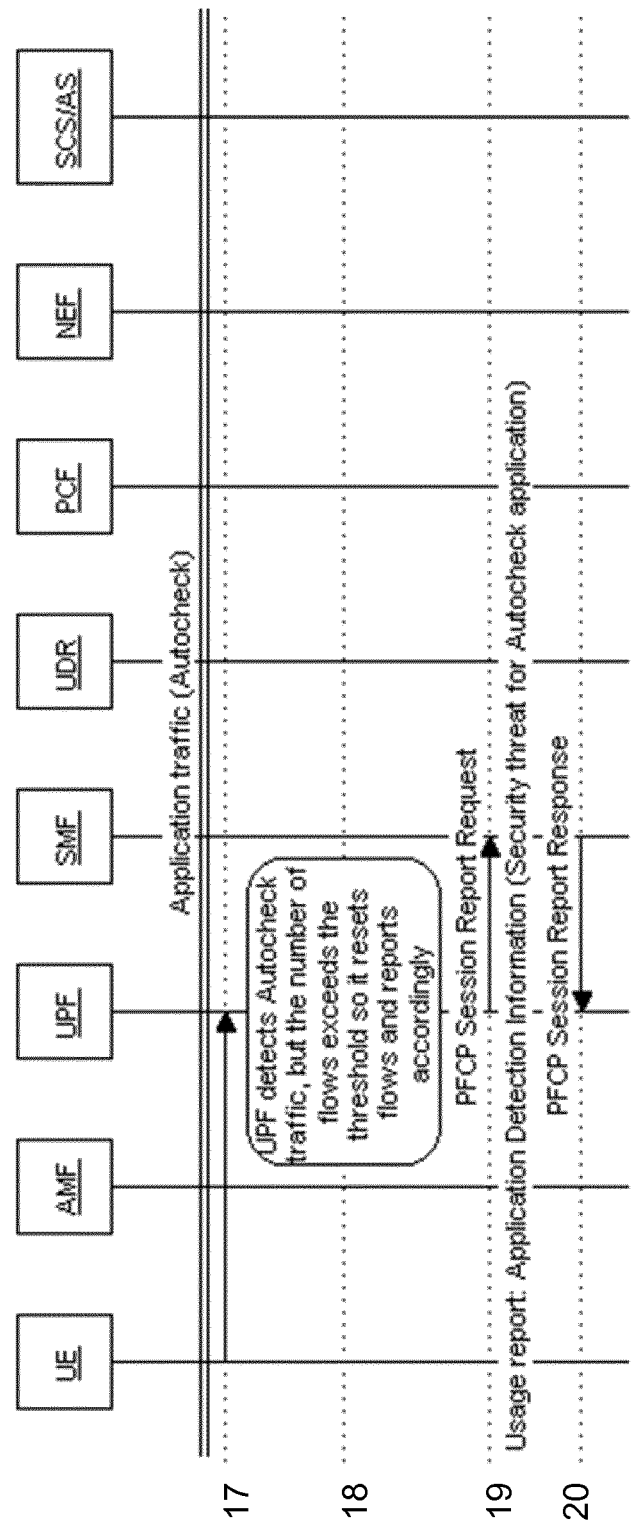

Turning to FIG. 3 and FIG. 4, a more detailed combined signalling and flowchart of some embodiments herein is provided.

In the following, the user data node 120 will be referred to as the UPF, the session node 140 will be referred to as the SMF, the policy node 150 will be referred to as the PCF, the application node 170 will be referred to as the SCS/AS, the attack information storing node 180 will be referred to as the UDR.

One or more of the following actions may be performed.

Action 1

The SCS/AS, e.g. AutomotiveX, for a certain application, e.g. Autocheck, provisions attack information for attacks in the operator network 101. The attack information may be provided in the form of a request. It is proposed to enhance the T8 API to include the attack information. As an example, the SCS/AS triggers an HTTP(S) POST message towards the NEF by setting as resource Universal Resource Identifier (URI) {apiRoot}/3gpp_t8_security management/v1/ and by passing one or more of the following parameters (scsAsId, externalAppId, type of attack, attack status, set of detection conditions for that type of attack including e.g. parameters like rate limit to avoid server overload, maximum number of simultaneous TCP/UDP flows, maximum number of not completed handshakes, etc.). Additionally, the SCS/AS might also send the policy (mitigation action) to apply in case the above thresholds are reached (e.g. reset flows exceeding the maximum number of simultaneous flows and notify). Finally, the SCS/AS may subscribe to notifications of detected attacks.

In general, the parameters exchanged through the enhanced T8 interface for transfer of the attack information are defined as follows:

scsAsId (SCS/AS Identifier) according to existing specifications.

externalAppId (External Application Identifier/s). This field identifies which is/are the SCS/AS application/s, aka the application 190, that are subject to this particular piece of attack information. This external identifier(s) of the application is/are translated into internal application identifiers (appId) by the NEF/SCEF.

In addition, the attack information as explained in more detail above is exchanged over the T8 interface.

Thus, the identifier of the application 190 may be an external or internal identifier of the application 190, such as externalAppId, appId or the like, depending on context in the following description. Whether the identifier of the application refers to the external or internal identifier is explained in more detail with reference to FIG. 3. In the example shown in FIG. 3, the information provisioned from SCS/AS are: scsAsId=AutomotiveX, externalAppId=Autocheck, securityManagement: typeOfAttack=DDoS, attackStatus=potential, detectionConditionList including maximum number of simultaneous TCP/UDP flows=5, mitigationAction=reset flows and notify, where securityManagement is an example of the attack information, typeOfAttack is an example of the type of attack, attackStatus is an example of the status of the attack, detectionConditionList is an example of the set of detection conditions, mitigationAction is an example of the mitigation action.

Hence, an example is provide as follows:

```
POST 3gpp_t8_security_management/v1 HTTP/1.1
Content-Type: application/json
(client headers...)
{
  "scsAsId": "automotiveX",
  "externalAppId": "autocheck",
  "securityManagement": [
    {
      "typeOfAttack": "ddos",
      "attackStatus": "potential",
      "detectionConditionList":
    {
      "maxflows": "5",
    },
      "mitigationAction": "reset, notify",
  ]
}
```

The example above is written in HTTP for simplicity. In the T8 interface, the information above goes via HTTPS.

As a further example, the attack information may be realized as:

typeOfAttack: "TCP SYN Ping Scan"

detectionConditionList (List of events):

E1: threshold for number of simultaneous TCP handshakes per user=N

E2: threshold for number of subnets requested per user=M.

Optionally, as a part of action 1, the SCS/AS may also send to NEF/SCEF, through T8 API for PFD Management, the PFDs for the target application/s. Thereby, allowing the network to identify the SCS/AS application's traffic. These PFDs will be handled by the PFDF (in NEF in the case of 5G) and distributed to SMF (and UPFs) through existing procedures. This is not shown in FIG. 3.

Accordingly, the embodiments herein proposes enhancements to the aforementioned T8 interface, but also to the corresponding interfaces in order to allow these to carry the attack information, sometimes referred to as security management policies/rules, towards the user data node 120, affecting e.g. Npcf, Nsmf, N4 interfaces, and to store them in the attack information storing node 180, affecting e.g. Nudr interface.

The identifier of the application 190 may be an external or internal identifier of the application 190, such as externalAppId, appId or the like, depending on context in the following description. The external identifier of the application 190 may be the externalAppId and the internal identifier of the application 190 may be the AppId. External or internal is used in relation to the operator network 101 and it is the responsibility of the NEF to translate between the external identifier and the internal identifier. Whether the identifier of the application refers to the external or internal identifier is shown in FIG. 3 which refers to externalAppId or AppId as appropriate.

Action 1 is similar to action A010 above.

Action 2

The NEF may send a response, such as T8 200 OK, to the SCS/AS.

Action 3

The NEF/SCEF authorizes the request of action 1. The NEF/SCEF may then sends towards the PCF, e.g. through an enhanced Npcf interface, by defining a Npcf_SecurityPolicyControl service for handling of the attack information a HTTP(S) POST message including the attack information, such as type of attack, attack status, detection conditions and mitigation action(s), together with the scsAsId and appId.

Action 3 is similar to action A020 above.

Action 4

The PCF may acknowledge the message of action 3 by sending Npcf 200 OK to the NEF.

Action 5

The PCF sends the received attack information for the corresponding application, as identified by the identifier of the application, to the UDR for storage.

It is proposed to store the attack information in UDR per application 190, not per subscriber. This is similar to existing application data that NEF/PFDF stores in UDR (per app, not per subscriber).

Action 5 is similar to action A030 above.

Action 6

The UDR may acknowledge the reception of the attack information by transmitting Nudr 200 OK to the PCF.

Action 7 and action 8

The UE triggers establishment of a session, such as a PDU session.

Action 9

The SMF contacts the PCF, e.g. using a Npcf SMPolicyControl Request, to retrieve the PCC rules applicable for this PDU session. The PCC rules may include information derived from the attack information as will be explained in the following. Action 9 is similar to action A040 above.

Action 10

The PCF retrieves so called subscriber policies from the UDR according to known manner. In addition, the PCF retrieves the attack information for the applications of interest, i.e. as given by the identifier of the application. Action 10 is similar to action A050 above.

Action 11

Hence, subsequently to action 10, the PCF transmits a HTTP(S) GET to a Nudr Security Management service that is provided by the UDR.

Action 12

The PCF receives, in response to action 11, the following information: appId=Autocheck, securityManagement: typeOfAttack=DDoS, detectionThresholdList including maximum number of simultaneous TCP/UDP flows=5, mitigationAction=reset flows and notify. The securityManagement exemplifies the attack information.

Additionally, as the PCF is aware of subscriber data like location data, UE type, cell, network slice, etc, the PCF can be further refining the original security policy provisioned by the ASP/OTT with subscriber related parameters (location data, UE type, cell, network slice, etc). PCF with the subscriber parameters, can determine which policy should be applied. ASP/OTT is not aware of all the subscriber information, only those data exposed by the network. OTT/ASP does not know which other actions can help in order to mitigate the attack. For example, in a network where there is a network slice (unknown data for the OTT/ASP) for malicious traffic, PCF can order to migrate these users to this slice. As an example, as described in action 1, ASP/OTT sends as mitigation action "reset, notify", but based on subscriber policies, PCF can send towards SMF (in action 14) as mitigation action "reset, notify, sliceQuarantine". Another example, according to the UE type, the PCF can trigger installation of specific software for collection information about the attack.

Action 13

The PCF generates PCC rules for the PDU session, where the PCC rules includes the attack information, or information based on the attack information, in the PCC rule/s for the target application(s), again given by the identifier of the application.

Action 14

Subsequent to action 13, the PCF passes the PCC rule(s) towards the SMF in e.g. a Npcf SMPolicyControl Response. This implies that the existing PCC rules are extended such as to also include the attack information, or at least some information based on the attack information. Action 14 is similar to action A070 above.

To be more specific, according to the embodiments herein it proposed to add information, shown as bold, to a PCC rule that comprises:
- a rule name;
- service identifier;
- service data flow filter(s);
- application identifier;
- precedence;
- gate status;
- QoS parameters;
- indication for PS to CS session continuity;
- charging key (i.e. rating group);
- other charging parameters;
- monitoring key;
- sponsor identity;
- application service provider identity;
- indication of access network information reporting;
- redirect.
- traffic steering policy identifier(s).
- attack information, or some information based on the attack information.

Action 15

The SMF selects the UPF and creates a PFCP session, e.g. by triggering N4 PFCP Session Establishment Request. It is proposed to define a new type of rule (SER for Security Enforcement Rule) which will include the attack information (type of attack, attack status, detection condition(s) and mitigation action). Based on this, the UPF will enable DDoS detection. Action 15 is similar to action A080 above.

To be more specific, the proposed SER may be specified as, e.g. an extension to 3GPP TS 29.244:

| SER parameters |
|---|
| SER ID |
| Type of Attack |
| Attack Status |
| Detection Condition list |
| Mitigation action |

| URR parameters |
|---|
| URR ID |
| Measurement method |
| Reporting triggers |
| Measurement period |
| Volume threshold |
| Volume quota |
| Time threshold |
| Time quota |
| QHT |
| Dropped DL traffic threshold |
| Monitoring time |
| Etc |

| QER parameters |
|---|
| QER ID |
| QER correlation ID |
| Gate Status |
| MBR |
| GBR |
| Packet Rate |
| DL Flow level marking |

| FAR parameters |
|---|
| FAR ID |
| Apply Action (Drop, Forward, Buffer, Notify CP first DL Packet buffered, Duplicate) |

| FAR forwarding parameters |
|---|
| Destination interface |
| Network instance |
| Redirection info |
| Outer header creation |
| Transport level marking |
| Forwarding policy |
| Header enrichment |

| PDR parameters |
|---|
| PDR ID |
| Precedence |
| PDI |
| FAR ID (1) |
| QER ID (0 . . . N) |
| URR ID (0 . . . M) |

| PDI parameters |
|---|
| Source Interface |
| Local F-TEID |

-continued

| |
|---|
| Network Instance |
| UE IP Address |
| SDF Filter |
| Application ID |

Action 16

The UPF may answer the SMF with the N4 PFCP Session Establishment Response (successful response implies UPF has accepted the SER rules above).

Action 19

The UPF notifies to the SMF, e.g. through PFCP Session Report procedure, indicating "Security threat for Autocheck application". This may mean that the UPF sends a report to the SMF. It is proposed to extend the existing Usage Report with that optional parameter "Security threat for Autocheck application" by including in Application Detection Information a new type of detected attack event (added in bold the extension proposed to 3GPP 29.244). Action 19 is similar to action A110.

Application Detection Information IE within Usage Report IE

Octet 1 and 2 Application Detection Information IE Type = 68 (decimal)
Octets 3 and 4 Length = n

| Information elements | P | Condition/Comment | Appl. Sx a | Sx b | Sx c | N4 IE Type |
|---|---|---|---|---|---|---|
| Application ID | M | This IE shall identify the Application ID for which a start or stop of traffic is reported. | — | X | X | X Application ID |
| Application Instance ID | C | When present, this IE shall identify the Application Instance Identifier for which a start or stop of traffic is reported. It shall be present, when reporting the start of an application, if the Reduced Application Detection Information flag was not set in the Measurement Information and if the flow information for the detected application is deducible. It shall be present, when reporting the stop of an application, if the Reduced Application Detection Information flag was not set in the Measurement Information and if it was provided when reporting the start of the application. | — | X | X | X Application Instance ID |
| Flow Information | C | When present, this IE shall contain the flow information for the detected application. It shall be present, when reporting the start of an application, if the Reduced Application Detection Information flag was not set in the Measurement Information and if the flow information for the detected application is deducible. | — | X | X | X Flow Information |
| Security Information | C | When present, this IE shall contain the detected attack type (e.g. DDoS) for the target application. Here, Security Information refers to the type of attack according to the terms used herein. | — | X | X | X Security Information |

The detailed example of FIG. 3 continues with reference to FIG. 4.

Action 17

The UE opens the target application, e.g. Autocheck, but creates a simultaneous number of TCP/UDP flows that exceeding a certain limit, i.e. an example of a detection condition.

Action 18

The UPF analyzes UE's application traffic and in this case a DDoS attack is detected, specifically the simultaneous number of TCP/UDP flows threshold as given by said certain limit has been reached. The UPF applies the corresponding mitigation actions indicated in the SER rule, in this case to reset the flows and to notify. Action 18 is similar to action A090.

Action 20

The SMF may transmit a response, indicating successful reception of the report of action 19, to the UPF.

Finally, the SCS/AS can de-provision the attack information, through HTTP(S) DELETE message (not shown in FIG. 4 for the sake of simplicity) towards the NEF by indicating the corresponding resource URI.

In view of the foregoing, some concluding remarks are provided to further exemplify and describe at least some embodiments herein.

As a summary, with at least some embodiments, the SCS/AS provisions towards the operator network 101, e.g. to the NEF/SCEF through T8 interface, and for the target application/s, i.e. the ones controlled by the SCS/AS, main characteristics of the application, such as number of total TCP connections, TCP connections open, TCP connections not completed, maximum number of TCP connections per user connected. The main characteristics are typically provided by means of the attack information.

The SCS/AS triggers an event towards the operator network when limits are reached, i.e. limits given by the main characteristics table. These limits have been provisioned to the NEF/SCEF from the SCS/AS. Then, the operator network, such as the UPF, checks the flows of the users that goes to this application and performs some actions like reset flows, packet dropping, avoid charging this traffic, notification towards SCS/AS, etc. These some actions are examples of mitigation actions.

The embodiments herein may be implemented by defining an enhanced T8 API related to the attack information or by extending the existing T8 APIs like NetworkParameterConfiguration API or AsSessionWithQoS API.

Additionally, the ASP/OTT can subscribe to notifications related to attacks towards on the applications of interest. Any known publish/subscribe framework may be used.

Figure 5:
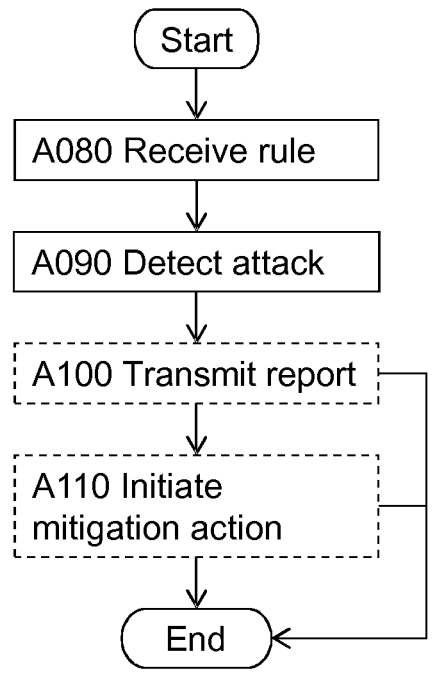
FIG. 5 is a flowchart illustrating embodiments of the method in the user data node.

In FIG. 5, a schematic flowchart of exemplifying methods in the user data node 120 is shown. Again, the same reference numerals as above have been used to denote the same or similar features, in particular the same reference numerals have been used to denote the same or similar actions. Accordingly, the user data node 120 performs a method for enabling management of an attack towards an application 190 hosted by an application node 170, whereby the application 190 degenerates due to the attack.

One or more of the following actions may be performed in any suitable order.

Action A080

The user data node 120 receives at least one rule originating from a policy node 150. Said at least one rule comprises attack information provided to the policy node 150, and an identifier of the application 190 to which the attack information applies. The attack information relates to the management of the attack and the attack information comprises:
  a type of attack,
  a set of detection conditions relating to detection of attacks of the type of attack, and
  a mitigation action to be invoked when at least one detection condition of the set of detection conditions is fulfilled, whereby degeneration of the application 190 caused by the attacks of the type of attack is mitigatable, and
  the like.

Action A090

The user data node 120 detects, in traffic towards the application 190, the attack while utilizing said at least one rule. The detection 18 of the attack may be caused by that at least one detection condition of the set of detection conditions is fulfilled.

Action A110

In response to the detection of the attack, the user data node 120 may initiate the mitigation action according to the attack information of the rule.

Alternatively or additionally, in response to the detection of the attack, the user data node 120 may transmit, to a session node 140 for managing a session between the application 190 and a user equipment 110 served by the application 190, a report indicating the mitigation action for a type of the detected attack.

Figure 6:
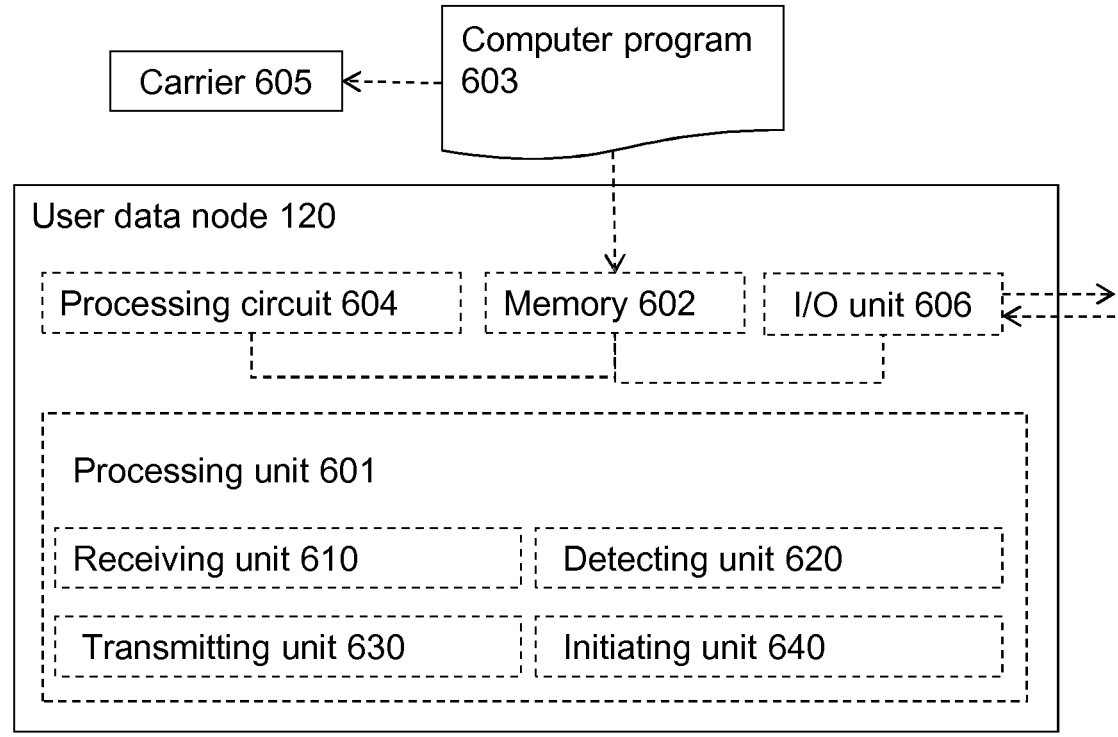
FIG. 6 is a block diagram illustrating embodiments of the user data node.

With reference to FIG. 6, a schematic block diagram of embodiments of the user data node 120 of FIG. 1 is shown.

The user data node 120 may comprise a processing unit 601, such as a means for performing the methods described herein. The means may be embodied in the form of one or more hardware units and/or one or more software units. The term "unit" may thus refer to a circuit, a software block or the like according to various embodiments as described below.

The user data node 120 may further comprise a memory 602. The memory may comprise, such as contain or store, instructions, e.g. in the form of a computer program 603, which may comprise computer readable code units.

According to some embodiments herein, the user data node 120 and/or the processing unit 601 comprises a processing circuit 604 as an exemplifying hardware unit, which may comprise one or more processors. Accordingly, the processing unit 601 may be embodied in the form of, or 'realized by', the processing circuit 604. The instructions may be executable by the processing circuit 604, whereby the user data node 120 is operative to perform the methods of FIG. 2 and/or FIG. 5. As another example, the instructions, when executed by the user data node 120 and/or the processing circuit 604, may cause the user data node 120 to perform the method according to FIG. 2 and/or FIG. 5.

In view of the above, in one example, there is provided a user data node 120 for enabling management of an attack towards an application 190 hosted by an application node 170, whereby the application 190 degenerates due to the attack. Again, the memory 602 contains the instructions executable by said processing circuit 604 whereby the user data node 120 is operative for:
  receiving at least one rule originating from a policy node 150, wherein said at least one rule comprises attack information provided to the policy node 150, and an identifier of the application 190 to which the attack information applies, wherein the attack information relates to the management of the attack and the attack information comprises:
    a type of attack,
    a set of detection conditions relating to detection of attacks of the type of attack, and
    a mitigation action to be invoked when at least one detection condition of the set of detection conditions is fulfilled, whereby degeneration of the application 190 caused by the attacks of the type of attack is mitigatable, and
    detecting, in traffic towards the application 190, the attack while utilizing said at least one rule.

FIG. 6 further illustrates a carrier 605, or program carrier, which provides, such as comprises, mediates, supplies and the like, the computer program 603 as described directly above. The carrier 605 may be one of an electronic signal, an optical signal, a radio signal and a computer readable medium.

In some embodiments, the user data node 120 and/or the processing unit 601 may comprise one or more of a receiving unit 610, a detecting unit 620, a transmitting unit 630, and an initiating unit 640 as exemplifying hardware units. The term "unit" may refer to a circuit when the term "unit" refers to a hardware unit. In other examples, one or more of the aforementioned exemplifying hardware units may be implemented as one or more software units.

Moreover, the user data node 120 and/or the processing unit 601 may comprise an Input/Output unit 606, which may be exemplified by the receiving unit and/or the transmitting unit when applicable.

Accordingly, the user data node 120 is configured for enabling management of an attack towards an application 190 hosted by an application node 170, whereby the application 190 degenerates due to the attack.

Therefore, according to the various embodiments described above, the user data node 120 and/or the processing unit 601 and/or the receiving unit 610 is configured for receiving at least one rule originating from a policy node 150. Said at least one rule comprises attack information provided to the policy node 150, and an identifier of the application 190 to which the attack information applies. The attack information relates to the management of the attack and the attack information comprises:
- a type of attack,
- a set of detection conditions relating to detection of attacks of the type of attack, and
- a mitigation action to be invoked when at least one detection condition of the set of detection conditions is fulfilled, whereby degeneration of the application 190 caused by the attacks of the type of attack is mitigatable, and
- the like.

The user data node 120 and/or the processing unit 601 and/or the detecting unit 620 is configured for detecting, in traffic towards the application 190, the attack while utilizing said at least one rule.

The user data node 120 and/or the processing unit 601 and/or the detecting unit 620 may be configured for detecting the attack by detecting that at least one detection condition of the set of detection conditions is fulfilled.

The user data node 120 and/or the processing unit 601 and/or the initiating unit 640 may be configured for initiating the mitigation action according to the attack information of the rule, in response to the detection of the attack The user data node 120 and/or the processing unit 601 and/or the transmitting unit 630 may be configured for transmitting, to a session node 140 for managing a session between the application 190 and a user equipment 110 served by the application 190, a report indicating the mitigation action for a type of the detected attack, in response to the detection of the attack.

Figure 7:
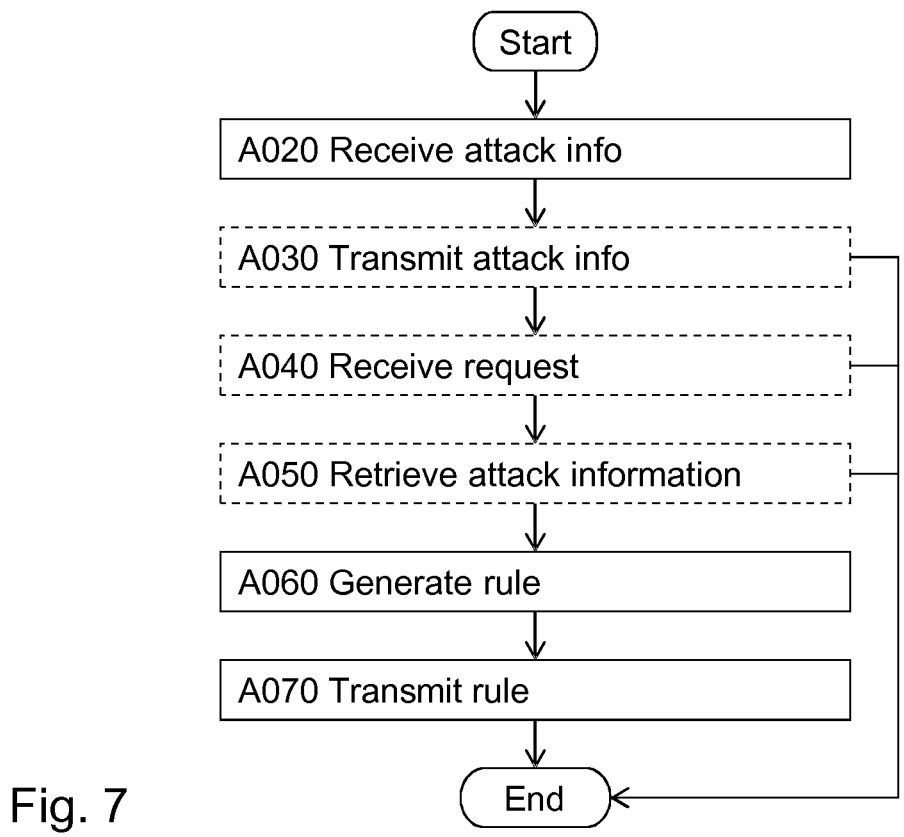
FIG. 7 is a flowchart illustrating embodiments of the method in the policy node.

In FIG. 7, a schematic flowchart of exemplifying methods in the policy node 150 is shown. Again, the same reference numerals as above have been used to denote the same or similar features, in particular the same reference numerals have been used to denote the same or similar actions. Accordingly, the policy node 150 performs a method for enabling management of an attack towards an application 190 hosted by an application node 170, whereby the application 190 degenerates due to the attack.

One or more of the following actions may be performed in any suitable order.

Action A020

The policy node 150 receives attack information and an identifier of the application 190 to which the attack information applies. The attack information relates to the management of the attack and the attack information comprises:
- a type of attack,
- a set of detection conditions relating to detection of attacks of the type of attack, and
- a mitigation action to be invoked when at least one detection condition of the set of detection conditions is fulfilled, whereby degeneration of the application 190 caused by the attacks of the type of attack is mitigatable, and
- the like.

The attack information may originate from the application node 170.

Action A030

The policy node 150 may transmit, towards an attack information storing node 180 for storing the attack information for the application 190 indicated by the identifier, the identifier and the attack information.

Action A040

The policy node 150 may receive a request for at least one rule to be applied to a session for enabling a user equipment 110 to be served by the application 190. The request is caused by that the user equipment 110 requests the session, and the request indicates the identifier of the application 190.

Action A050

The policy node 150 may retrieve, from an attack information storing node 180, attack information based on the identifier of the application 190.

Action A060

The policy node 150 generates at least one rule based on the attack information. Said at least one rule comprises the identifier and the attack information. Said at least one rule may be generated for the session based on the attack information.

Action A070

The policy node 150 transmits said at least one rule towards a user data node 120 for managing the attack.

Figure 8:
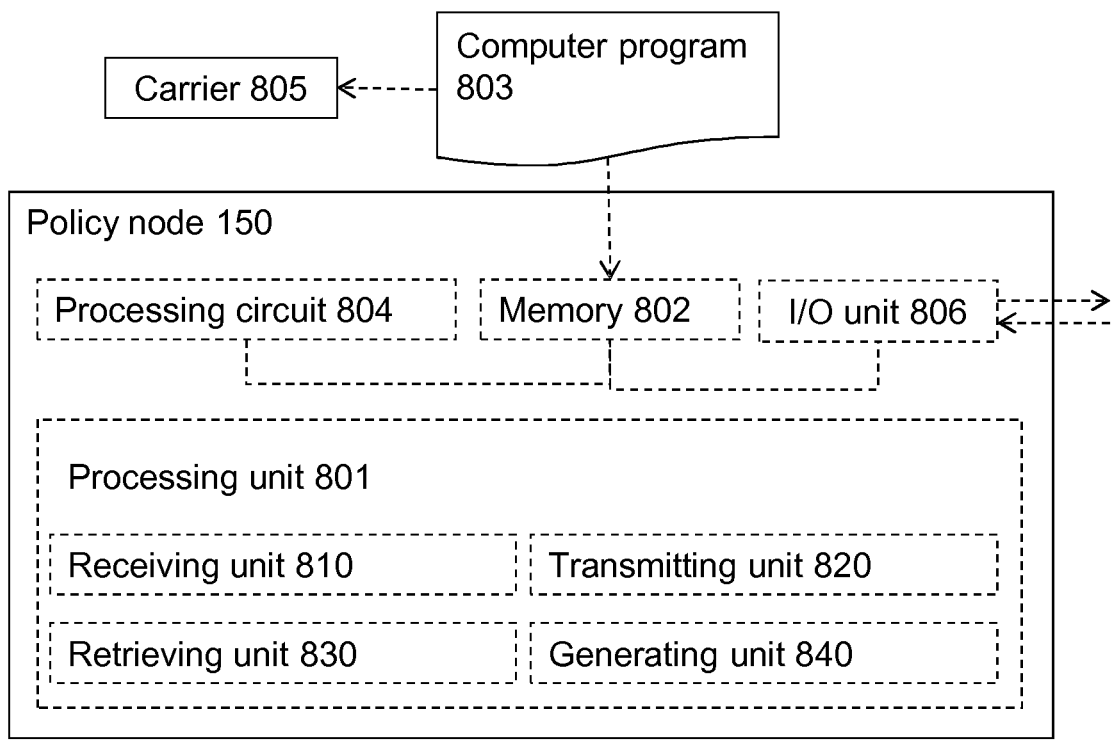
FIG. 8 is a block diagram illustrating embodiments of the policy node.

With reference to FIG. 8, a schematic block diagram of embodiments of the policy node 150 of FIG. 1 is shown.

The policy node 150 may comprise a processing unit 801, such as a means for performing the methods described herein. The means may be embodied in the form of one or more hardware units and/or one or more software units. The term "unit" may thus refer to a circuit, a software block or the like according to various embodiments as described below.

The policy node 150 may further comprise a memory 802. The memory may comprise, such as contain or store, instructions, e.g. in the form of a computer program 803, which may comprise computer readable code units.

According to some embodiments herein, the policy node 150 and/or the processing unit 801 comprises a processing circuit 804 as an exemplifying hardware unit. Accordingly, the processing unit 801 may be embodied in the form of, or 'realized by', the processing circuit 804. The instructions may be executable by the processing circuit 804, whereby the policy node 150 is operative to perform the methods of FIG. 2 and/or FIG. 7. As another example, the instructions, when executed by the policy node 150 and/or the processing circuit 804, may cause the policy node 150 to perform the method according to FIG. 2 and/or FIG. 7.

In view of the above, in one example, there is provided a policy node 150 for enabling management of an attack towards an application 190 hosted by an application node 170, whereby the application 190 degenerates due to the attack. Again, the memory 802 contains the instructions executable by said processing circuit 804 whereby the policy node 150 is operative for:

receiving attack information and an identifier of the application 190 to which the attack information applies, wherein the attack information relates to the management of the attack and the attack information comprises:
- a type of attack,
- a set of detection conditions relating to detection of attacks of the type of attack, and
- a mitigation action to be invoked when at least one detection condition of the set of detection conditions is fulfilled, whereby degeneration of the application 190 caused by the attacks of the type of attack is mitigatable, generating at least one rule based on the attack information, wherein said at least one rule comprises the identifier and the attack information, and transmitting said at least one rule towards a user data node 120 for managing the attack.

FIG. 8 further illustrates a carrier 805, or program carrier, which provides, such as comprises, mediates, supplies and the like, the computer program 803 as described directly above. The carrier 805 may be one of an electronic signal, an optical signal, a radio signal and a computer readable medium.

In further embodiments, the policy node 150 and/or the processing unit 801 may comprise one or more of a unit receiving 810, a transmitting unit 820, a retrieving unit 830, and a generating unit 840 as exemplifying hardware units. The term "unit" may refer to a circuit when the term "unit" refers to a hardware unit. In other examples, one or more of the aforementioned exemplifying hardware units may be implemented as one or more software units.

Moreover, the policy node 150 and/or the processing unit 801 may comprise an Input/Output unit 806, which may be exemplified by the receiving unit and/or the transmitting unit when applicable.

Accordingly, the policy node 150 is configured for enabling management of an attack towards an application 190 hosted by an application node 170, whereby the application 190 degenerates due to the attack.

Therefore, according to the various embodiments described above, the policy node 150 and/or the processing unit 801 and/or the receiving unit 810 is configured for receiving attack information and an identifier of the application 190 to which the attack information applies. The attack information may originate from the application node 170. The attack information relates to the management of the attack and the attack information comprises:
a type of attack,
a set of detection conditions relating to detection of attacks of the type of attack, and
a mitigation action to be invoked when at least one detection condition of the set of detection conditions is fulfilled, whereby degeneration of the application 190 caused by the attacks of the type of attack is mitigatable, and
the like.

The policy node 150 and/or the processing unit 801 and/or the generating unit 840 is configured for generating at least one rule based on the attack information. Said at least one rule comprises the identifier and the attack information.

The policy node 150 and/or the processing unit 801 and/or the transmitting unit 820 is configured for transmitting said at least one rule towards a user data node 120 for managing the attack.

The policy node 150 and/or the processing unit 801 and/or the receiving unit 810 may be configured for receiving a request for at least one rule to be applied to a session for enabling a user equipment 110 to be served by the application 190. The request is caused by that the user equipment 110 requests the session, and the request indicates the identifier of the application 190.

The policy node 150 and/or the processing unit 801 and/or the generating unit 410 may be configured for generating said at least one rule for the session based on the attack information.

The policy node 150 and/or the processing unit 801 and/or the transmitting unit 820 may be configured for transmitting, towards an attack information storing node 180 for storing the attack information for the application 190 indicated by the identifier, the identifier and the attack information.

The policy node 150 and/or the processing unit 801 and/or the retrieving unit 830 may be configured for retrieving, from an attack information storing node 180, attack information based on the identifier of the application 190.

Figure 9:
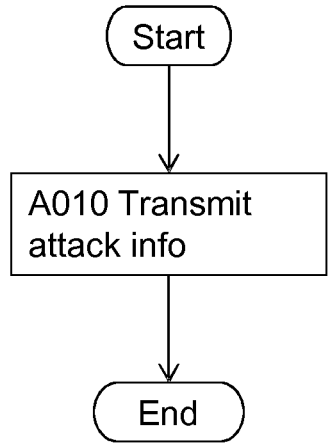
FIG. 9 is a flowchart illustrating embodiments of the method in the application node.

In FIG. 9, a schematic flowchart of exemplifying methods in the application node 170 is shown. Again, the same reference numerals as above have been used to denote the same or similar features, in particular the same reference numerals have been used to denote the same or similar actions. Accordingly, the application node 170 performs a method for enabling management of an attack towards the application 190, whereby the application 190 degenerates due to the attack.

The following action may be performed.

Action A010

The application node 170 transmits, towards a policy node 150, attack information relating to the management of at least the attack and an identifier of the application 190 to which the attack information applies, the attack information comprises:
a type of attack,
a set of detection conditions relating to detection of attacks of the type of attack, and
a mitigation action to be invoked when at least one detection condition of the set of detection conditions is fulfilled, whereby degeneration of the application 190 caused by the attacks of the type of attack is mitigatable, and
the like.

Figure 10:
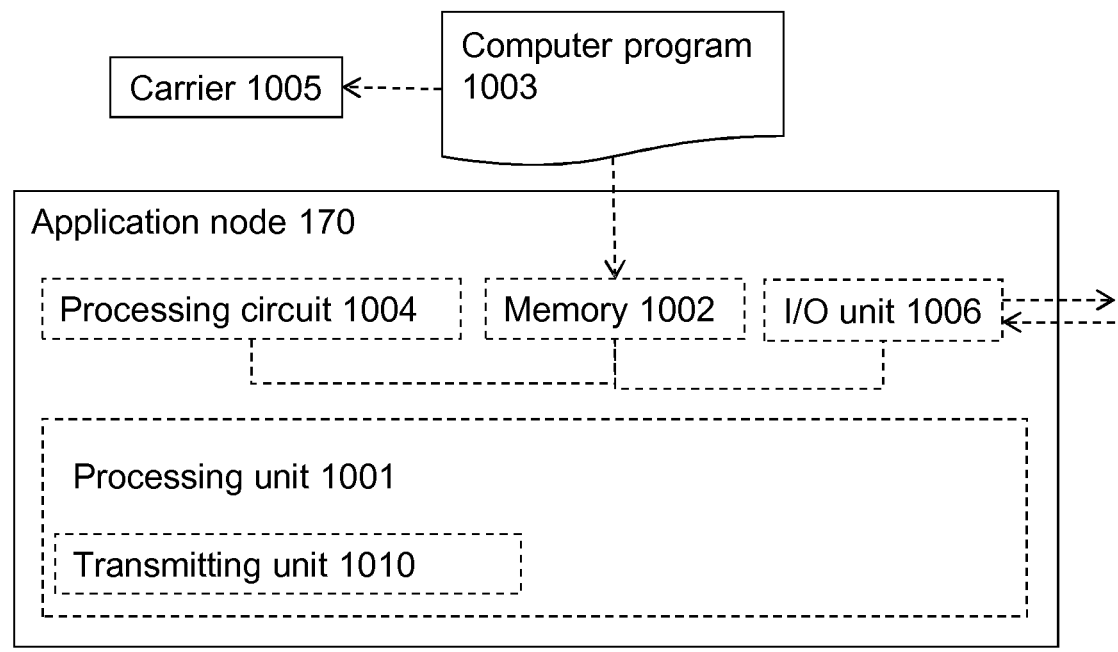
FIG. 10 is a block diagram illustrating embodiments of the application node.

With reference to FIG. 10, a schematic block diagram of embodiments of the application node 170 of FIG. 1 is shown.

The application node 170 may comprise a processing unit 1001, such as a means for performing the methods described herein. The means may be embodied in the form of one or more hardware units and/or one or more software units. The term "unit" may thus refer to a circuit, a software block or the like according to various embodiments as described below.

The application node 170 may further comprise a memory 1002. The memory may comprise, such as contain or store, instructions, e.g. in the form of a computer program 1003, which may comprise computer readable code units.

According to some embodiments herein, the application node 170 and/or the processing unit 1001 comprises a processing circuit 1004 as an exemplifying hardware unit. Accordingly, the processing unit 1001 may be embodied in the form of, or 'realized by', the processing circuit 1004. The instructions may be executable by the processing circuit 1004, whereby the application node 170 is operative to perform the methods of FIG. 2 and/or FIG. 9. As another example, the instructions, when executed by the application node 170 and/or the processing circuit 1004, may cause the application node 170 to perform the method according to FIG. 2 and/or FIG. 9.

In view of the above, in one example, there is provided an application node 170 for hosting an application 190, for enabling management of an attack towards the application 190, whereby the application 190 degenerates due to the attack. Again, the memory 1002 contains the instructions executable by said processing circuit 1004 whereby the application node 170 is operative for:
transmitting, towards a policy node 150, attack information relating to the management of at least the attack and an identifier of the application 190 to which the attack information applies, wherein the attack information comprises:
a type of attack,
a set of detection conditions relating to detection of attacks of the type of attack, and a mitigation action to be invoked when at least one detection condition of the set of detection conditions is fulfilled, whereby degeneration of the application 190 caused by the attacks of the type of attack is mitigatable.

FIG. 10 further illustrates a carrier 1005, or program carrier, which provides, such as comprises, mediates, supplies and the like, the computer program 1003 as described directly above. The carrier 1005 may be one of an electronic signal, an optical signal, a radio signal and a computer readable medium.

In further embodiments, the application node 170 and/or the processing unit 1001 may comprise one or more of a transmitting unit 1010 as an exemplifying hardware unit. The term "unit" may refer to a circuit when the term "unit" refers to a hardware unit. In other examples, one or more of the aforementioned exemplifying hardware units may be implemented as one or more software units.

Moreover, the application node 170 and/or the processing unit 1001 may comprise an Input/Output unit 1006, which may be exemplified by a receiving unit and/or the transmitting unit when applicable.

Accordingly, the application node 170 is configured for hosting an application 190. Moreover, the application node 170 is configured for enabling management of an attack towards the application 190, whereby the application 190 degenerates due to the attack.

Therefore, according to the various embodiments described above, the application node 170 and/or the processing unit 1001 and/or the transmitting unit 410 is configured for transmitting, towards a policy node 150, attack information relating to the management of at least the attack and an identifier of the application 190 to which the attack information applies, the attack information comprises:
  a type of attack,
  a set of detection conditions relating to detection of attacks of the type of attack, and
  a mitigation action to be invoked when at least one detection condition of the set of detection conditions is fulfilled, whereby degeneration of the application 190 caused by the attacks of the type of attack is mitigatable, and
  the like.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a user data node, for enabling management of an attack towards an application hosted by an application node, whereby the application degenerates due to the attack, wherein the method comprises:
   receiving at least one rule originating from a policy node, wherein said at least one rule comprises attack information provided to the policy node, and an identifier of the application to which the attack information applies, wherein the attack information relates to the management of the attack and the attack information comprises:
   a type of attack,
   a set of detection conditions relating to detection of attacks of the type of attack, and
   a mitigation action to be invoked when at least one detection condition of the set of detection conditions is fulfilled, whereby degeneration of the application caused by the attacks of the type of attack is mitigatable, and
   detecting, in traffic towards the application, the attack while utilizing said at least one rule.

2. The method of claim 1, wherein the detection of the attack is caused by that at least one detection condition of the set of detection conditions is fulfilled.

3. The method of claim 1, wherein the method further comprises:
   in response to the detection of the attack, initiating the mitigation action according to the attack information of the rule.

4. The method of claim 1, wherein the method further comprises:
   in response to the detection of the attack, transmitting, to a session node for managing a session between the application and a user equipment served by the application, a report indicating the mitigation action for a type of the detected attack.

5. A method, performed by a policy node, for enabling management of an attack towards an application hosted by an application node, whereby the application degenerates due to the attack, wherein the method comprises:
   receiving attack information and an identifier of the application to which the attack information applies, wherein the attack information relates to the management of the attack and the attack information comprises:
   a type of attack,
   a set of detection conditions relating to detection of attacks of the type of attack, and
   a mitigation action to be invoked when at least one detection condition of the set of detection conditions is fulfilled, whereby degeneration of the application caused by the attacks of the type of attack is mitigatable,
   generating at least one rule based on the attack information, wherein said at least one rule comprises the identifier and the attack information, and
   transmitting said at least one rule towards a user data node for managing the attack.

6. The method of claim 5, wherein the method further comprises:
   receiving a request for at least one rule to be applied to a session for enabling a user equipment to be served by the application, wherein the request is caused by that the user equipment requests the session, and the request indicates the identifier of the application, and
   generating said at least one rule for the session based on the attack information.

7. The method of claim 5, further comprising:
   transmitting, towards an attack information storing node for storing the attack information for the application indicated by the identifier, the identifier and the attack information, and
   retrieving, from an attack information storing node, attack information based on the identifier of the application.

8. The method of claim 5, wherein the attack information originates from the application node.

9. A method, performed by an application node for hosting an application, for enabling management of an attack towards the application, whereby the application degenerates due to the attack, wherein the method comprises:
   transmitting, towards a policy node, attack information relating to the management of at least the attack and an identifier of the application to which the attack information applies, wherein the attack information comprises:
   a type of attack,
   a set of detection conditions relating to detection of attacks of the type of attack, and
   a mitigation action to be invoked when at least one detection condition of the set of detection conditions is fulfilled, whereby degeneration of the application caused by the attacks of the type of attack is mitigatable.

10. A method, performed by an operator network comprising a policy node and a user data node, for enabling management of an attack towards an application hosted by an application node, whereby the application degenerates due to the attack, wherein the method comprises:
receiving (A020, 3), by the policy node, attack information and an identifier of the application to which the attack information applies, wherein the attack information relates to the management of the attack and the attack information comprises:
a type of attack,
a set of detection conditions relating to detection of attacks of the type of attack, and
a mitigation action to be invoked when at least one detection condition of the set of detection conditions is fulfilled, whereby degeneration of the application caused by the attacks of the type of attack is mitigatable,
generating, by the policy node, at least one rule based on the attack information, wherein said at least one rule comprises the identifier and the attack information, and
transferring, from the policy node to the user data node, said at least one rule, and
detecting, by the user data node in traffic towards the application, the attack while utilizing said at least one rule.

11. A user data node configured for enabling management of an attack towards an application hosted by an application node, whereby the application degenerates due to the attack, wherein the user data node is configured to perform the steps recited in claim 1.

12. The user data node of claim 11, wherein the user data node is further configured for:
initiating the mitigation action according to the attack information of the rule, in response to the detection of the attack.

13. The user data node of claim 11, wherein the user data node is further configured for:
transmitting, to a session node for managing a session between the application and a user equipment served by the application, a report indicating the mitigation action for a type of the detected attack, in response to the detection of the attack.

14. A policy node configured for enabling management of an attack towards an application hosted by an application node, whereby the application degenerates due to the attack, wherein the policy node is configured to perform the steps recited in claim 5.

15. The policy node of claim 14, wherein the policy node is further configured for:
receiving a request for at least one rule to be applied to a session for enabling a user equipment to be served by the application, wherein the request is caused by that the user equipment requests the session, and the request indicates the identifier of the application, and
generating said at least one rule for the session based on the attack information.

16. The policy node of claim 14, wherein the policy node is further configured for:
transmitting, towards an attack information storing node for storing the attack information for the application indicated by the identifier, the identifier and the attack information, and
retrieving, from an attack information storing node, attack information based on the identifier of the application, wherein
the attack information originates from the application node.

17. An application node for hosting an application, wherein the application node is configured for enabling management of an attack towards the application, whereby the application degenerates due to the attack, wherein the application node is configured to perform the steps recited in claim 9.

18. A computer program product comprising a non-transitory computer readable medium storing a computer program comprising computer readable code units which when executed on a user data node cause the user data node to perform the method of claim 1.

19. A computer program product comprising a non-transitory computer readable medium storing a computer program comprising computer readable code units which when executed on a policy node cause the policy node to perform the method of claim 5.

20. A computer program product comprising a non-transitory computer readable medium storing a computer program comprising computer readable code units which when executed on an application node cause the application node to perform the method of claim 9.

* * * * *